United States Patent [19]

Stivers

[11] Patent Number: 5,338,456
[45] Date of Patent: Aug. 16, 1994

[54] WATER PURIFICATION SYSTEM AND METHOD

[76] Inventor: Lewis E. Stivers, 920 Westbrook Dr., Plano, Tex. 75075

[21] Appl. No.: 19,555

[22] Filed: Feb. 19, 1993

[51] Int. Cl.$^5$ .......................................... B01D 61/00
[52] U.S. Cl. .................................. 210/652; 210/650; 210/654; 210/86; 210/87; 210/134; 95/36; 95/38
[58] Field of Search ................ 210/652, 195.2, 257.2, 210/908, 663, 750, 754, 900, 86, 87, 134, 180; 95/36, 38, 41

[56] References Cited

U.S. PATENT DOCUMENTS

| | | | |
|---|---|---|---|
| 4,000,065 | 12/1976 | Ladha et al. | 210/652 |
| 4,153,556 | 8/1979 | Riedinger | 210/750 |
| 4,161,445 | 7/1979 | Coillet | 210/186 |
| 4,161,446 | 7/1979 | Coillet | 210/186 |
| 4,348,280 | 9/1982 | George et al. | 210/134 |
| 4,495,031 | 1/1985 | Breidenbach et al. | 210/652 |
| 4,595,498 | 6/1986 | Cohen et al. | 210/195.2 |
| 4,626,346 | 12/1986 | Hall | 210/257.2 |
| 4,770,770 | 9/1988 | Regumathan et al. | 210/257.2 |
| 4,787,980 | 11/1988 | Ackermann et al. | 210/652 |
| 4,990,260 | 2/1991 | Pisani | 210/664 |

FOREIGN PATENT DOCUMENTS

| | | | |
|---|---|---|---|
| 3243817 | 7/1984 | Fed. Rep. of Germany . | |
| 3080804 | 4/1988 | Japan | 210/900 |
| 1245893 | 10/1988 | Japan | 210/900 |

*Primary Examiner*—Robert A. Dawson
*Assistant Examiner*—Ana M. Fortuna
*Attorney, Agent, or Firm*—David H. Judson

[57] ABSTRACT

A water purification process for removing dissolved solids of the type that are normally present in a municipal water supply or the like. The process uses a forced draft decarbonator having an inlet and a product outlet, a vacuum degasifier having an inlet, a product outlet and a water level sensor, and a reverse osmosis unit having an inlet, a product outlet and a brine outlet. Preferably, the vacuum degasifier is located downstream of the forced draft decarbonator with the product outlet of the forced draft decarbonator being coupled to the inlet of the vacuum degasifier. The reverse osmosis unit is located downstream of the vacuum degasifier with the product outlet of the vacuum degasifier being coupled to the inlet of the reverse osmosis unit. Water to be purified is provided to the inlet of the forced draft decarbonator at a predetermined rate. According to the invention, the rate at which water to be purified is provided to the inlet of the forced draft decarbonator is a function of a predetermined water level in the vacuum degasifier.

17 Claims, 2 Drawing Sheets

WATER PURIFICATION SYSTEM AND METHOD

TECHNICAL FIELD

The present invention relates generally to water purification and more particularly to a novel system and method for separating impurities from water using a vacuum degasifier and a reverse osmosis membrane.

BACKGROUND OF THE INVENTION

The process of reverse osmosis is currently in widespread use for the treatment of water. Its value is derived from the ability of a semipermeable membrane to preferentially reject the passage of most salts, a high percentage of organic contaminants, and nearly all particulate matter. The reverse osmosis process, however, has certain well-known limitations and thus is not used as a standalone water purification treatment.

For example, it is customary, and in many cases imperative, to pretreat the water supply ahead of the reverse osmosis to avoid fouling of membrane surfaces. Such pretreatment in many cases limits the performance of the unit because it can reduce the ability of the membranes to reject contaminants. Moreover, in many raw water supplies, calcium and alkalinity levels are sufficiently high that direct treatment by reverse osmosis would cause precipitation of calcium carbonate on membrane surfaces, reducing productivity. To avoid such precipitation, it is known to pretreat the water by addition of polyelectrolyte addition or by acid addition. In the case of acid addition, the effectiveness of the membrane is reduced, and therefore the treated water salt level is increased as is the cost of further removal of dissolved solids downstream of the reverse osmosis unit. Moreover, if acid is added to reduce alkalinity, the alkalinity is converted to carbon dioxide. Carbon dioxide, however, passes freely through the membrane, thus also increasing the cost of downstream treatment.

Attempts to solve the deficiencies of such prior reverse osmosis systems are also well-known. One such system is described in U.S. Pat. No. 4,574,049 to Pittner. This patent describes a chemically enhanced reverse osmosis water purification system in which an inlet of a second reverse osmosis unit is coupled in series to the product water outlet of a first reverse osmosis unit. Additionally, the product from the first reverse osmosis unit is treated with a chemical treatment agent, such as a sodium hydroxide solution, upstream of the inlet of the second reverse osmosis unit. This dual reverse osmosis system is said to alleviate the problems associated with prior art reverse osmosis techniques.

While the two-pass reverse osmosis system of Pittner provides certain advantages over single pass techniques, the permeate output from the first reverse osmosis unit still includes a high amount of carbon dioxide. Therefore, additional costly downstream processing is still required even in the dual pass system.

It is also well-known in the prior art to use equipment to remove carbon dioxide from water to be purified. Conventionally, carbon dioxide removal equipment reduces the anionic loading on and thus the cost of anion exchangers. Carbon dioxide removal is most efficient at low pH values and therefore is performed after a cation exchanger or a reverse osmosis unit. Typically, such removal is effected using either a forced-draft decarbonator or a vacuum degasifier. Vacuum degasifiers are primarily used where it is desired to remove dissolved oxygen down to as low as 20–50 ppb. Forced draft decarbonators are used where dissolved oxygen in the water is not a concern. While such carbon dioxide removal equipment has been used in combination with reverse osmosis treatment units, such systems still have not provided efficient and cost-effective separation of gaseous impurities from the water.

There remains a need to provide improved water purification systems and methods that overcome these and other problems associated with prior art water treatment techniques.

BRIEF SUMMARY OF THE INVENTION

It is an object of the present invention to provide an improved reverse osmosis-based water purification system and method.

It is a still further object of the invention to provide a water purification system wherein a forced draft decarbonator and a vacuum degasifier are used in conjunction with and upstream of a reverse osmosis unit.

Still another object of the invention is to provide improved water purification techniques that are inexpensive yet reliable.

It is another object of the invention to provide a water purification system and method using a forced draft decarbonator, a vacuum degasifier and a reverse osmosis unit arranged in a predetermined manner. The forced draft decarbonator is located upstream of the vacuum degasifier, which in turn is located upstream of the reverse osmosis unit. The water levels in the force draft decarbonator and the vacuum degasifier are controlled by a feedback control system to insure that a fixed steady state level of water is output from the vacuum degasifier. Such control provides significant advantages and achieves high gas removal as compared with more complex and expensive prior art methods.

Another object of the invention is to provide a water purification system that will reduce or eliminate the need for carbon filtration to remove chlorine gas from water entering the reverse osmosis unit.

These and other objects of the invention are provided in a water purification process for removing dissolved solids of the type that are normally present in a municipal water supply or the like. The process uses a forced draft decarbonator having an inlet and a product outlet, a vacuum degasifier having an inlet, a product outlet and a water level sensor, and a reverse osmosis unit having an inlet, a product outlet and a brine outlet. Preferably, the vacuum degasifier is located downstream of the forced draft decarbonator with the product outlet of the forced draft decarbonator being coupled to the inlet of the vacuum degasifier. The reverse osmosis unit is located downstream of the vacuum degasifier with the product outlet of the vacuum degasifier being coupled to the inlet of the reverse osmosis unit. Water to be purified is provided to the inlet of the forced draft decarbonator at a predetermined rate. According to the invention, the rate at which water to be purified is provided to the inlet of the forced draft decarbonator is a function of a predetermined water level in the vacuum degasifier.

In particular, the water level sensor in the vacuum degasifier continuously monitors the water level therein. The sensed value is compared with a predetermined water level. The rate at which water is provided to the inlet of the forced draft decarbonator is then adjusted to achieve a constant product output from the vacuum degasifier. Specifically, as the water level in the vacuum degasifier increases above the predetermined water level, the rate at which water is provided to the inlet of the forced draft decarbonator is reduced, and vice versa. In this way a steady state level of water exists in the vacuum degasifier.

In the preferred embodiment, the water to be purified is conditioned upstream of the forced draft decarbonator. Such conditioning comprises filtering the water to remove suspended solids and treating the water with an antiscalant to prohibit crystal growth. Following such conditioning and prior to being supplied to the inlet of the forced draft decarbonator, the water may also be treated with an acidic chemical treatment agent to lower the pH of the water. Suitable acidic chemical treatment agents for this purpose include one or more of the following: sulfuric acid, hydrochloric acid and acetic acid. In addition, according to the invention is also desirable to treat the water from the vacuum degasifier product outlet with a basic chemical treatment agent to raise the pH of the water prior to providing the water to the reverse osmosis unit. Suitable basic chemical treatment agents for this purpose include one or more of the following: disodium phosphate, sodium hydroxide, potassium hydroxide and ammonium hydroxide.

The product from the outlet of the reverse osmosis unit is directed toward a point of use or storage for purified water.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
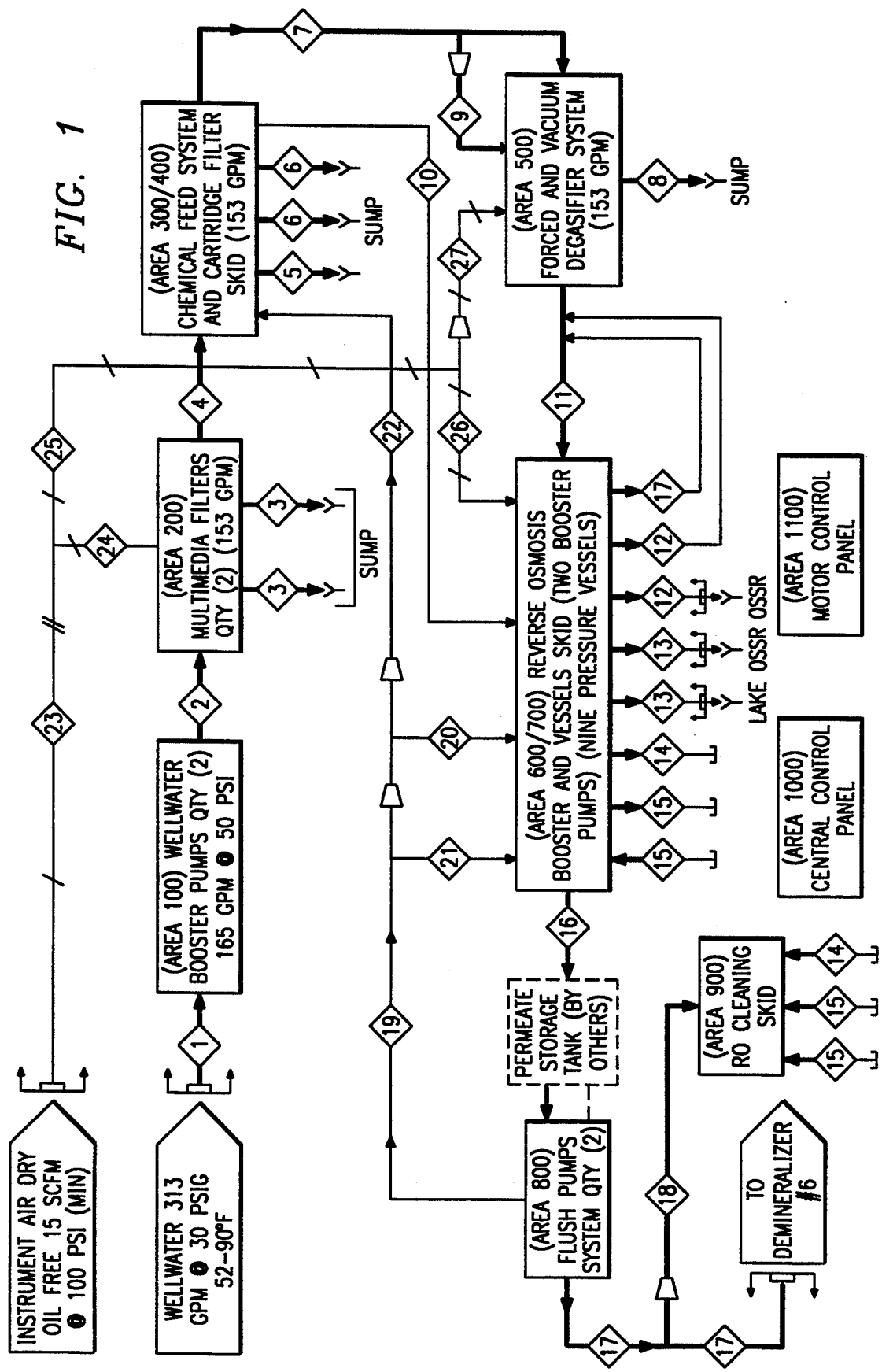
FIG. 1 is a schematic flow diagram of a water purification system according to the present invention.

Referring now to FIG. 1, a water purification system 10 is shown and includes a feed water inlet connected to receive water to be treated from a municipal water supply or the like. The feed water flows through line 1 into area 100 including one or more well water booster pumps. The booster pumps increase the pressure of the feed water and supply the feed water via line 2 to area 200. Area 200 includes a pair of multimedia filters (which preferably use garnet, sand and anthracite) for filtering out relatively large particulates, i.e., larger than 25 micromhos. One or more lines 3 supply drainage from the filters to a sump. The output of area 200 is supplied via line 4 to area 300/400, which includes a chemical feed system and a cartridge filter. The chemical feed system 300 treats the water with an acidic chemical treatment to lower the pH of the water and with an antiscalant to prohibit crystal growth. Suitable acids include one or more of the following: sulfuric acid, hydrochloric acid and acetic acid. The cartridge filter 400 filters the water to remove suspended solids. The area 300/400 includes output lines 5 and 6 for providing drainage to a sump.

The output of area 300/400 is supplied via line 7 to area 500, which comprises a forced draft decarbonator and vacuum degasifier system. The output is also supplied to area 500 through a reducer in line 9. The forced draft decarbonator and vacuum degasifier system 500 removes excess carbon dioxide. Specifically, the forced draft decarbonator removes carbon dioxide in excess of the amounts present at atmospheric pressure. The vacuum degasifier removes additional carbon dioxide and reduces dissolved oxygen levels to as low as 20–50 ppb. As will be described, the inputs and outputs to and from the forced draft decarbonator and the vacuum degasifier are controlled to insure that the output of the vacuum degasifier is substantially constant throughout the operating cycle. Additionally, the degasifier area is upstream of the reverse osmosis unit.

Specifically, and with reference back to FIG. 1, the water purification system further includes an area 600/700 comprising a reverse osmosis booster and vessel skid. The output of the degasifier area 500 is fed via line 11 to the reverse osmosis unit, which may comprise a single or a dual pass RO system. One such dual pass RO system is described in U.S. Pat. No. 4,579,049 to Pittner. The RO area 600/700 preferentially rejects the passage of most salts, a high percentage of organic contaminants and nearly all particulate matter. If a dual pass system is used, the area includes two booster pumps. The area 600/700 includes a plurality of pressure vessels to achieve the desired water production rate and recovery. It also includes a pair of output lines 12 and 17 that recycle a portion of the RO output back to line 11 to recycle the concentrate or reject of the second pass system during normal operation. Additionally, the other line would recycle the permeate from the second pass if the quality was not satisfactory, i.e., during startup. The RO booster pumps advantageously raise the pressure of the water because the RO unit(s) operate more efficiently at higher pressures. Although not meant to be limiting, the RO unit may be a Model BW30-4040 manufactured by FilmTec, although units from other manufacturers are useful as well. The RO unit includes a product outlet and a brine outlet.

The main RO output is supplied via line 16 to a permeate storage tank or other point of use (not shown). Where a permeate storage tank is used, the output thereof may also be supplied to area 800 which comprises a flush pump system. The flush pump system replaces the high TDS water in the RO membranes with low TDS water upon shutdown. This has the effect of preventing minute scale formation since the anti-scalant chemicals have a limited time effectiveness. The output of flush system is supplied via lines 19, 20, 21 and 22 for use in the reverse osmosis units and the chemical feed system. As also seen in FIG. 1, an output from the chemical feed system/cartridge filter skid (area 300/400) is supplied via line 10 to the reverse osmosis booster pump which develops the flow and pressure required for the RO membrane.

Another output of the flush pump system 800 is fed via line 17 to a demineralizer and also via line 18 to an RO cleaning skid (area 900). The RO cleaning skid functions to clean the RO unit. In particular, periodically the RO membranes may have to be chemically cleaned to remove any suspended solids that have collected or scale that has formed on the surface of the membranes. Cleaning chemicals are recirculated through the membranes during this cleaning process by the RO cleaning skid. The system also includes a central control panel 1000 and a motor control panel 1100 for controlling the various electrical, mechanical, pneumatic and hydraulic control elements used in the system, and suitable air lines 23, 24, 25, 26 and 27 are provided to provide instrument air to the various pieces of equipment.

The use of a forced draft decarbonator/vacuum degasifier pair located upstream of and providing a steady state output to a reverse osmosis unit provides several unexpected advantages over the prior art by significantly reducing carbon dioxide levels prior to the reverse osmosis treatment. Degasification prior to the reverse osmosis significantly reduces the cost of the process by increasing the effectiveness of the RO treatment and obviating any downstream processing of the product water following the RO treatment. It enhances the separation of gaseous impurities from the remainder of the water such that the reverse osmosis treatment can preferentially reject the passage of salts, organic contaminants and other particulate matter.

Thus, in the illustrated preferred embodiment of the invention, suitable means are provided for water to be purified to the inlet of a forced draft decarbonator/vacuum degasifier pair. The water may be pretreated by softening and a pH-reduction prior to being supplied to the forced draft decarbonator, and the decarbonator and degasifier are supported in a predetermined manner. In particular, the flow rate to the inlet of the forced draft decarbonator is controlled as a function of the water level in the vacuum degasifier to insure that the output of the vacuum degasifier (which is supplied to the RO unit) is substantially constant throughout the operating cycle. If necessary, after vacuum degasification, a suitable basic treatment agent (e.g., disodium phosphate) is injected into the stream to re-adjust (i.e., raise) the pH upstream of the RO unit. The reverse osmosis unit is provided downstream and in series with the vacuum degasifier.

Figure 2:
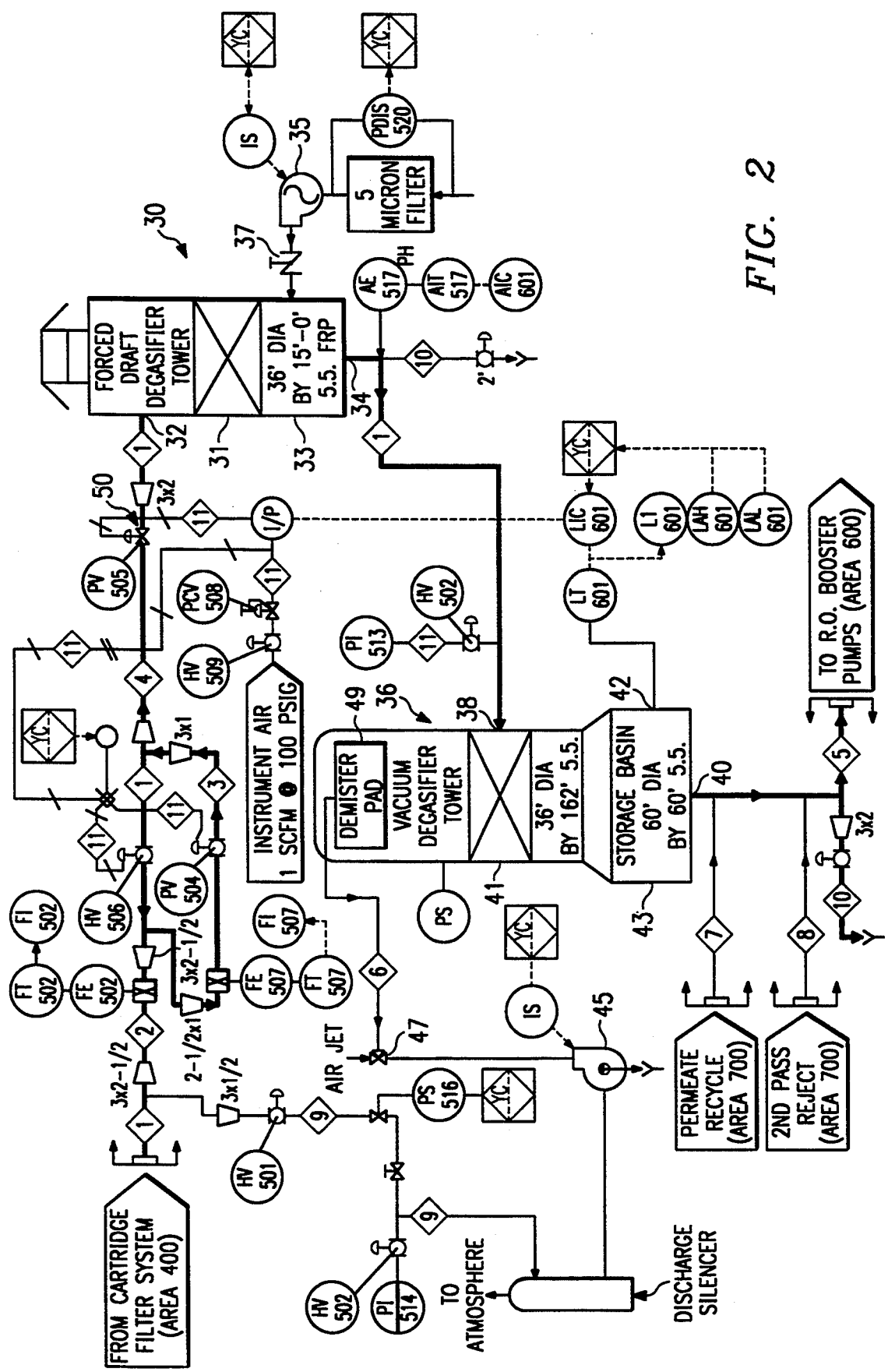
FIG. 2 is a detailed schematic diagram of the forced draft decarbonator and vacuum degasifier system identified as area 500 in FIG. 1.

Referring now to FIG. 2, a detailed schematic diagram is shown of the preferred forced draft decarbonator and vacuum degasifier area 500. A forced draft decarbonator 30 has an inlet 32 and a product outlet 34. A vacuum degasifier 36 has an inlet 38, a product outlet 40 and a water level sensor 42. The vacuum degasifier is located downstream of the forced draft decarbonator with the product outlet 34 of the forced draft decarbonator being coupled to the inlet 38 of the vacuum degasifier.

The forced draft decarbonator 30 is of a known design and includes a tower 31 and a clearwell 33 at the bottom of the tower. An air blower 35 supplies the forced air draft through a butterfly valve 37. The required air flow through the tower 31 depends on the influent alkalinity, the service flow rate and temperature, the desired effluent carbon dioxide concentration and the depth of the packing material. Although not shown in detail, suitable instrumentation is provided for continuously monitoring service water flow rate, air flow rate, inlet air pressure and the water level on the clearwell.

The vacuum degasifier included is also of a known configuration and includes a tower 41 and a storage basin 43. A vacuum supply system, e.g., pump 45, pulls a vacuum through line 6 and valve 47. Line 6 is attached to the tower head through a demister pad 49. As noted above, the vacuum degasifier includes water level sensor 42. Alternatively, a pair of sensors (one for high-level and one for low-level) may be used. The sensor 42 is continuously monitored to determine the water level in the storage basin 43.

If the water level is above or below a predetermined threshold, a control signal is supplied via line 11 to regulate the flow of water into the forced draft decarbonator via a motorized ball valve 50 (that could also be a butterfly or other type of valve and may be pneumatic rather than motorized). When the water level in the storage basin is too low, the valve 50 is opened to a greater extent to allow a higher rate of influent to the forced draft decarbonator. Likewise, if the water level in the storage basin rises above the predetermined threshold, the valve is tightened to reduce the rate of influent to the decarbonator. In either case, the effluent from the degasifier outlet is substantially fixed.

As also seen in FIG. 2, the effluent from the vacuum degasifier may be combined with permeate recycle and the RO reject (if a dual pass RO system is used). Before being supplied to the RO booster pumps, it may be desirable to inject a basic treatment agent into the water stream to re-adjust, i.e., raise the pH. Suitable basic treatment agents include one or more of the following: disodium phosphate, sodium hydroxide, potassium hydroxide and ammonium hydroxide.

Preferably, the vacuum degasifier operates at a vacuum of approximately 19 mm Hg. It, simulating the operation of the system, the amount of carbon dioxide at the inlet of the forced draft decarbonator, the outlet of the forced draft decarbonator and the outlet of the vacuum degasifier, respectively, was expected to be (in mg/L ions) 152.9, 2.6 and 0.9, respectively. The acid pretreatment reduces the pH (prior to the forced draft decarbonator) to about 4.4, and the basic treatment agent (post-vacuum degasification) raises the pH back up to about 6.5. Thus it can be seen that the forced draft decarbonator reduces the amount of carbon dioxide to a certain extent and that the vacuum degasifier reduces the level significantly more. A prior art vacuum degasifier or forced draft decarbonator, located downstream of the RO unit, does not provide this degree of carbon dioxide removal without the addition of chemicals that then raise the TDS of the water. Moreover, the process of the present invention provides reduced levels of carbon dioxide in the effluent compared to the prior art even though the amount of water subject to degasification is significantly greater (due to the fact that the degasification area 500 is located upstream of the RO unit instead of downstream as is conventional in the art).

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A water purification process for removing dissolved solids of the type that are normally present in a water supply, comprising the steps of:
    providing a forced draft decarbonator having an inlet, and a product outlet;

providing a vacuum degasifier having an inlet, a product outlet and a water level sensor;

providing a reverse osmosis unit having an inlet, a product outlet and a brine outlet;

locating the vacuum degasifier downstream of said forced draft decarbonator with the product outlet of the forced draft decarbonator being coupled to the inlet of the vacuum degasifier;

locating the reverse osmosis unit downstream of said vacuum degasifier with the product outlet of the vacuum degasifier being coupled to the inlet of the reverse osmosis unit;

providing water to be purified to the inlet of the forced draft decarbonator, the forced draft decarbonator providing an initial reduction in the level of carbon dioxide in the water and the vacuum degasifier providing a further reduction in said level as the water is processed therethrough; and adjusting the rate at which water to be purified is provided to the inlet of the forced draft decarbonator as a function of a predetermined water level in the vacuum degasifier to provide a substantially constant flow rate output from the vacuum degasifier.

2. The process as described in claim 1 further including the step of:
conditioning the water to be purified upstream of the forced draft decarbonator.

3. The process as described in claim 1 further including the step of:
treating the water to be purified at a location upstream of the forced draft decarbonator with an acidic chemical treatment agent to lower the pH of the water.

4. The process as described in claim 3 wherein the acidic chemical treatment agent is selected from the group consisting of sulfuric acid, hydrochloric acid and acetic acid.

5. The process as described in claim 1 further including the step of:
treating the water from the vacuum degasifier product outlet with a basic chemical treatment agent to raise the pH of the water.

6. The process as described in claim 5 wherein the basic chemical treatment agent is selected from a group consisting of disodium phosphate, sodium hydroxide, potassium hydroxide and ammonium hydroxide.

7. The process as described in claim 1 further including the steps of:
at a location upstream of the forced draft decarbonator, filtering and treating the water to remove suspended solids and to prohibit crystal growth.

8. The process as described in claim 7 wherein the water is treated with an antiscalant.

9. The process as described in claim 1 further including the step of:
directing the product from the outlet of the reverse osmosis unit toward a point of use or storage for purified water.

10. A method, using a reverse osmosis unit, for removing dissolved solids of the type that are normally present in a water supply comprising the steps of:
providing a forced draft decarbonator having an inlet, and a product outlet;
providing a vacuum degasifier having an inlet, a product outlet and a water level sensor;
locating the vacuum degasifier downstream of said forced draft decarbonator with the product outlet of the forced draft decarbonator being coupled to the inlet of the vacuum degasifier;
locating the reverse osmosis unit downstream of said vacuum degasifier with the product outlet of the vacuum degasifier being coupled to the inlet of the reverse osmosis unit;
providing water to be purified to the inlet of the forced draft decarbonator, the forced draft decarbonator providing an initial reduction in the level of carbon dioxide in the water and the vacuum degasifier providing a further reduction in said level as the water is processed therethrough; and
adjusting the rate at which water to be purified is provided to the inlet of the forced draft decarbonator as a function of a predetermined water level in the vacuum degasifier to provide a subsstantially constant flow rate output from the vacuum degasifier.

11. The method as described in claim 10 further including the step of:
treating the water to be purified at a location upstream of the forced draft decarbonator with an acidic chemical treatment agent to lower the pH of the water.

12. The method as described in claim 10 further including the step of:
treating the water from the vacuum degasifier product outlet with a basic chemical treatment agent to raise the pH of the water.

13. The method as described in claim 10 further including the steps of:
at a location upstream of the forced draft decarbonator, filtering and treating the water to remove suspended solids and to prohibit crystal growth.

14. The method as described in claim 10 further including the step of:
directing the product from the outlet of the reverse osmosis unit toward a point of use of storage for purified water.

15. A method, using a reverse osmosis unit, for removing dissolved solids of the type that are normally present in a water supply comprising the steps of:
providing a forced draft decarbonator having an inlet, and a product outlet;
providing a vacuum degasifier having an inlet, a product outlet and a water level sensor;
locating the vacuum degasifier downstream of said forced draft decarbonator with the product outlet of the forced draft decarbonator being coupled to the inlet of the vacuum degasifier;
providing water to be purified to the inlet of the forced draft decarbonator wherein carbon dioxide in excess of atmospheric pressure is removed by the forced draft decarbonator and additional carbon dioxide is removed by the vacuum degasifier; and
sensing the water level in the vacuum degasifier;
comparing the sensed water level with a predetermined water level; and
adjusting the rate at which water to be purified is provided to the inlet of the forced draft decarbonator as a function of the comparison to achieve a constant product output from the vacuum degasifier.

16. The method as described in claim 15 further including the steps of:
locating the reverse osmosis unit downstream of said vacuum degasifier with the constant product outlet of the vacuum degasifier being coupled to the inlet of the reverse osmosis unit; and directing the product from the outlet of the reverse osmosis unit toward a point of use or storage for purified water.

17. A method, using a reverse osmosis unit, for removing dissolved solids of the type that are normally present in a water supply, comprising the steps of:

providing a forced draft decarbonator having an inlet, and a product outlet;

providing a vacuum degasifier having an inlet, a product outlet and a water level sensor;

locating the vacuum degasifier downstream of said forced draft decarbonator with the product outlet of the forced draft decarbonator being coupled to the inlet of the vacuum degasifier;

locating the reverse osmosis unit downstream of said vacuum degasifier with the product outlet of the vacuum degasifier being coupled to the inlet of the reverse osmosis unit;

treating the water to be purified at a location upstream of the forced draft decarbonator with an acidic chemical treatment agent to lower the pH of the water;

providing the treated water to the inlet of the forced draft decarbonator, the forced draft decarbonator providing an initial reduction in the level of carbon dioxide in the water and the vacuum degasifier providing a further reduction in said level as the water is processed therethrough;

adjusting the rate at which the treated water is provided to the inlet of the forced draft decarbonator as a function of a predetermined water level in the vacuum degasifier to provide a substantially constant flow rate output from the vacuum degasifier;

treating the water from the vacuum degasifier product outlet with a basic chemical treatment agent to raise the pH of the water; and directing the product from the outlet of the reverse osmosis unit toward a point of use or storage for purified water.

* * * * *